May 7, 1940.  W. G. WEHR  2,199,863
CRANE BRAKE
Filed April 13, 1937   2 Sheets-Sheet 1
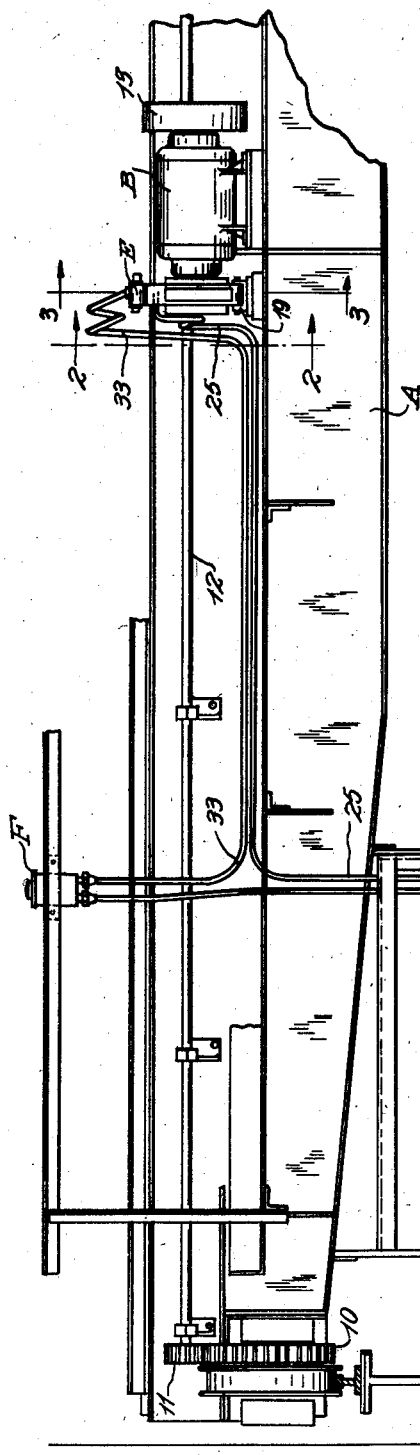
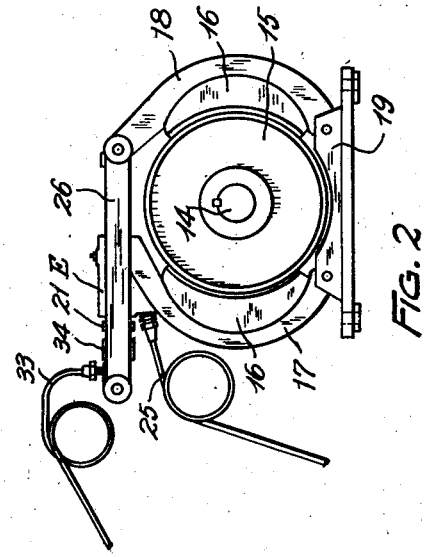
INVENTOR.
WILLIAM G. WEHR
BY Kwis Hudson & Kent
ATTORNEYS May 7, 1940. W. G. WEHR 2,199,863
CRANE BRAKE
Filed April 13, 1937 2 Sheets-Sheet 2

INVENTOR.
WILLIAM G. WEHR
BY Kwis Hudson & Kent
ATTORNEYS

Patented May 7, 1940

2,199,863

UNITED STATES PATENT OFFICE 2,199,863

CRANE BRAKE

William George Wehr, Wickliffe, Ohio, assignor to The Cleveland Crane & Engineering Company, Wickliffe, Ohio, a corporation of Ohio Application April 13, 1937, Serial No. 136,589

2 Claims. (Cl. 188—151)

The present invention relates to hydraulic brake apparatus, and particularly to hydraulic brake apparatus for traveling cranes.

An object of the invention is the provision of a novel and improved hydraulic brake apparatus which will be inexpensive to manufacture, rugged in construction, and which will withstand the abuses to which it is subjected in operation.

Another object of the present invention is the provision of a novel and improved hydraulic brake apparatus comprising a closed hydraulic system from which the liquid cannot leak.

Another object of the present invention is the provision of a novel and improved hydraulic brake apparatus for traveling cranes.

Another object of the present invention is the provision of a novel and improved hydraulic brake apparatus for traveling cranes comprising a liquid reservoir located above the hydraulic pressure actuated motor connected to the movable brake element which motor is, in turn, located above the pressure producing means.

Further objects and advantages of the present invention will be apparent from the following description of the preferred embodiment thereof described with reference to the accompanying drawings, forming a part of this specification, in which similar reference characters designate corresponding parts throughout the several views, and in which:

Fig. 1 is a partial elevation of a traveling crane embodying the present invention;

Fig. 2 is a partial section on the line 2—2 of Fig. 1;

Figure 3:
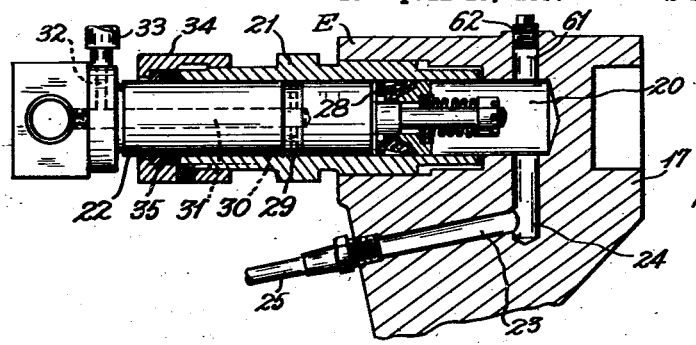
Fig. 3 is a section on the line 3—3 of Fig. 1 with portions shown in elevation.

The traveling crane shown in Fig. 1 of the drawings is of conventional construction except for the hydraulic brake apparatus employed and will not be described in detail. Suffice it to say that the reference character A designates a bridge upon which a trolley carrying the hoist mechanism, not shown, is adapted to travel. The bridge A is carried on end trucks which are adapted to travel along rails suitably supported by the building structure etc., adjacent opposite ends of the bridge. Movement of the bridge A along the rails, only one of which is shown in the drawings, is effected by an electric motor B supported on the bridge A and operatively connected to one of the wheels of each of the end trucks through the medium of reduction gears 10 and 11, the pinion 11 of which is fixed to the left hand end of a shaft 12 extending the length of the bridge. The shaft 12 is connected with the armature shaft 14 of the motor B by reduction gears, not shown, but located inside of the gear case 13. The supply of electrical energy to the motor B is controlled from a controller 9 located in the cage C, in a conventional manner. The right hand end of the crane, not shown in the drawings, is similar in construction to the end which is shown and one or more of the wheels of the right hand end truck are operatively connected to the right hand end of the shaft 12 by reduction gears similar to the gears 10 and 11. From the foregoing description it will be apparent that the crane is adapted to be moved in a direction normal to the plane of the paper by power applied to both ends thereof.

In general the hydraulic brake apparatus of the present invention comprises a fluid pressure producing means D located in the cage C, brake mechanism proper comprising a fluid pressure actuated motor E operatively connected to the wheels of the end trucks, in the present instance through the shaft 12, etc., and a liquid reservoir F located above both the fluid pressure producing means D and the fluid pressure actuated motor E. All of the aforesaid units are connected together in what may be called a closed system by the necessary conduits etc. In the present instance the braking force is applied to the armature shaft 14 of the motor B as is the usual practice in the crane art, and for this purpose the armature shaft 14 is extended towards the left and provided with a brake drum 15 keyed thereto, which cooperates with a plurality of brake shoes 16.

The brake shoes 16 are carried by members 17 and 18 pivotally connected to a stationary base member 19 which in turn is secured either to the base of the motor B or directly to the bridge of the crane. The upper end of the member 17, see Fig. 3, is enlarged and bored out as at 20 to receive the cylinder 21 of the fluid pressure actuated motor E, which motor also includes a piston 22 reciprocable within the cylinder 21. The cylinder 21 of the fluid pressure actuated motor is secured in an aperture 20 in a suitable manner and the member 17 forms a closure for the right hand end thereof, see Fig. 3. Fluid pressure or fluid under pressure is adapted to be supplied to and discharged from the right hand end of cylinder bore 20 through the medium of passages 23 and 24 formed in the member 17, and a pipe or tube 25 connected therewith and with the fluid pressure producing means D located in the cage. The member 18 of the brake mechanism proper is operatively connected to the piston 22 by link members 26. The construction is such that when fluid under pressure is forced into the cylinder bore 20 the brake shoes 16 are caused to engage the brake drum 15, and when the pressure is released the brake is released.

It will be readily appreciated that in the crane art it is particularly important that none of the liquid employed in the braking system escape therefrom and drip or drop onto the material being handled by the crane or over which the crane is moving and, for this purpose, provision is made in the present instance to return to the storage reservoir any liquid which may escape past the piston packing 28 of the motor E. Referring to Fig. 3 it will be seen that the piston 22 is provided with an annular groove 29 intermediate its ends, which groove is connected to or communicates with the storage reservoir F through passages 30, 31 and 32 formed in the piston, and a pipe or tube 33 connecting with the passage 32 and the reservoir F. Where the piston 22 projects through the left hand end of the cylinder 21 a suitable packing gland 34 and packing 35 are provided for the purpose of preventing the escape of liquid at this point.

Figure 4:
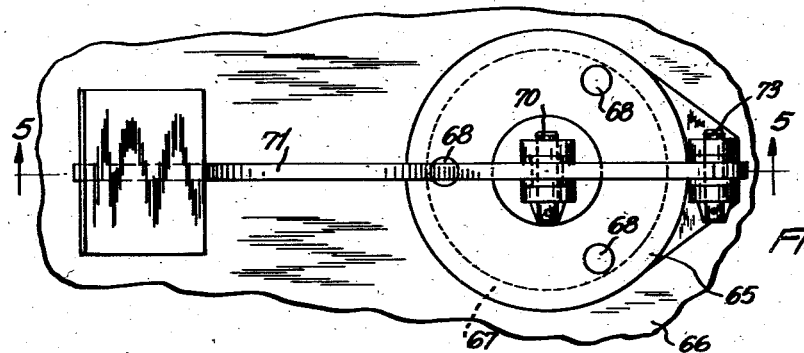
Fig. 4 is a plan view of the treadle actuated fluid pressure producing means located in the cage of the crane.
Figures 5, 6, 7:
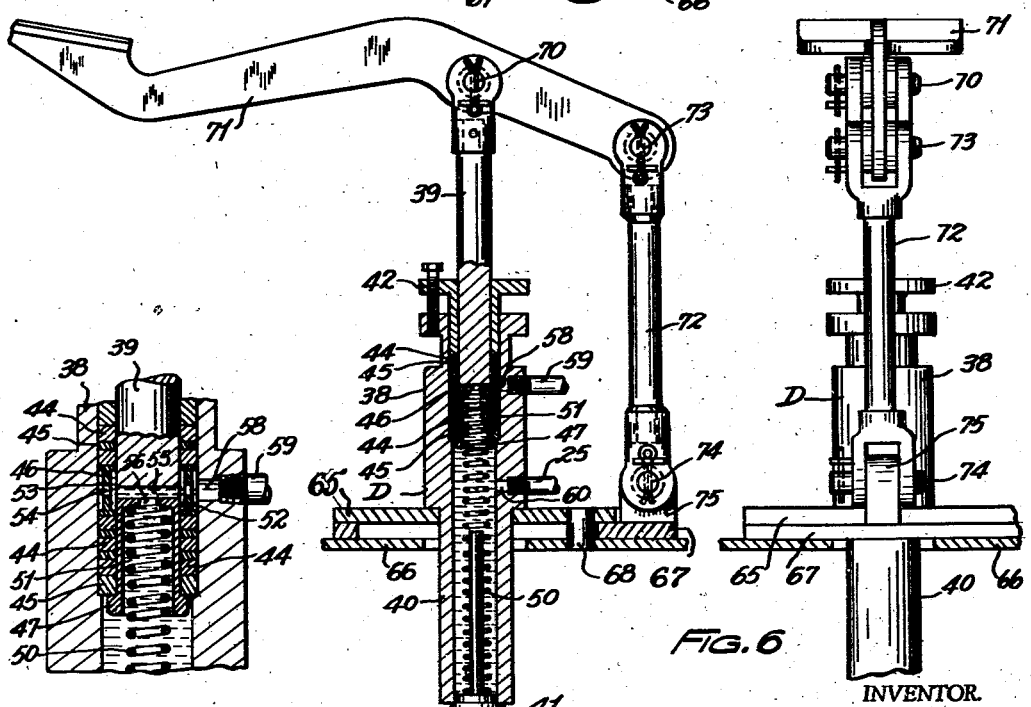
Fig. 5 is a section on the line 5—5 of Fig. 4.
Fig. 6 is a side view of Fig. 5 looking from the right.
Fig. 7 is an enlarged fragmentary view of a portion of Fig. 5.

The pressure producing means D, see Figs. 4, 5 and 6, comprises a cylinder 38, within the bore of which a treadle actuated plunger 39 is adapted to reciprocate. The cylinder 38 consists of a tubular member 40, the lower end of which is closed by a plug 41 while the upper end thereof, through which the plunger 39 projects, is provided with a packing gland 42. The upper end of the cylinder bore is counterbored to receive the packing gland 42 and suitable packing which consists of a plurality of packing washers 44 interposed between metal washers 45 located both above and below a rigid member 46. The lower end of the piston 39 is enlarged or provided with a shoulder or boss 47 which engages the lower washer 45 overhanging the cylinder bore, and limits the upward movement of the piston 39 under the action of a compression spring 50 located in the cylindrical bore and which spring continuously urges the plunger 39 in an upward direction.

The lower end of the spring 50 rests on the plug 41 and the upper end thereof extends into a counterbore 51 in the lower end of the piston 39. The member 46 which is preferably made of metal has both internal and external annular grooves 52 and 53, respectively, formed therein. The grooves 52 and 53 are in communication with each other through passages 54 in the member and the internal groove is in communication with the cylinder bore when the plunger is in its raised position, shown in Fig. 5, through the medium of horizontal and vertical passages 55 and 56, respectively, in the piston which passages communicate with each other and with the groove 52 in the member 46 and the bore 51 in the plunger 39 respectively. The external groove 53 in the member 46 is in constant communication with the liquid reservoir F through an opening or passage 58 in the cylinder 38 and a pipe or tube 59 connected therewith and with the reservoir F.

The pipe or tube 25 which connects the pressure producing means with the brake mechanism proper, enters the cylinder bore below the plunger 39 through a passage 60. The construction is such that the fluid system between the plunger 39 of the pressure producing means D and the piston 21 of the fluid pressure actuated motor E is constantly maintained full of liquid. Any liquid which escapes from the system while the plunger is depressed, as around the piston 21, is compensated for by the entry of fluid from the reservoir via the pipe or tube 59 etc. when the plunger is returned to its up position. The grooves 52 and 53 are elongated axially of the cylinder bore so that they will align with the passages 55 and 58 for various adjustments of the plunger packing. A threaded aperture 61 in the member 17 opening into the cylinder bore 20 of the fluid pressure actuated motor E and closed by a plug 62 facilitates the initial filling of the system with liquid, as the plug 62 can be readily removed to permit the escape of air trapped in the system.

The cylinder 38 of the pressure producing member D is fixed, as by welding, to a circular plate 65 supported by the floor 66 of the cage C through the medium of a ring-shaped member 67 positioned thereunder, and a plurality of pins 68 fixed in both the plate 65 and the floor 66. As previously stated, the plunger 39 is treadle operated and for this purpose the upper end of the plunger is pivotally connected by a pin 70 to a pedal 71 intermediate the ends of the pedal. The right hand end of the pedal 71, as viewed in Fig. 5, is pivotally connected to the upper end of a link 72 by a pin 73, and the lower end of the link 72 is in turn pivotally connected by a pin 74 to a projection or member 75 fixed to a part of the member 67 which projects out from underneath the circular plate 65. The pins 68 extend through the central opening in the ring-like member 67 and the construction is such that the member 67, together with the link 72 and the pedal 71, etc., can be rotated or adjusted about the axis of the cylinder bore so that the pedal may be positioned at any convenient angle.

From the foregoing description of the preferred embodiment of the invention it will be apparent that the objects of the invention heretofore enumerated have been attained and that a new and improved hydraulic brake apparatus especially adapted for traveling cranes has been provided. While the preferred embodiment of the invention has been described with considerable detail, I do not wish to be limited to the particular construction shown, which may be varied within the scope of this invention. It is my intention to cover hereby all adaptations, modifications and uses thereof which come within the practice of those skilled in the art to which the invention relates, and I particularly point out and claim as my invention the following:

1. In a traveling crane the combination of a bridge, a cage suspended from the bridge, hydraulically operated friction brake apparatus comprising a movable braking element carried by the bridge and located above the cage, a hydraulically actuated motor comprising a cylinder and a piston reciprocable therein operatively connected to said movable braking element for actuating the same, means located in the cage for producing hydraulic pressure, means for operatively connecting said last mentioned means with said hydraulically actuated motor, a liquid reservoir carried by said bridge and located above said hydraulically actuated motor, and means for connecting a portion of said cylinder located adjacent the low pressure side of the head of said piston with said reservoir.

2. In a traveling crane the combination of a bridge, a cage suspended from the bridge, hydraulically-operated friction brake apparatus comprising a movable brake element carried by the bridge and located above the cage, a hydraulically-actuated motor comprising a cylinder and a piston reciprocable therein located adjacent to and operatively connected to said movable brake element for actuating the same, a cylinder located in the cage, a conduit connected to said cylinder and said hydraulically-actuated motor for establishing communication therebetween, a piston reciprocable in said cylinder, means for moving said piston in said cylinder, a liquid reservoir carried by said bridge and located above said hydraulically-actuated motor, and a conduit connected to said cylinder and said reservoir for establishing communication therebetween when said piston is in its retracted position.

WILLIAM GEORGE WEHR.